United States Patent [19]  
Malik

[11] 3,861,839  
[45] Jan. 21, 1975

[54] DIFFUSION MOLDING APPARATUS
[75] Inventor: Raj K. Malik, Lemon Grove, Calif.
[73] Assignee: General Dynamics Corporation, San Diego, Calif.
[22] Filed: Nov. 8, 1973
[21] Appl. No.: 414,044

[52] U.S. Cl................ 425/78, 425/195, 425/405 R, 425/425, 425/357
[51] Int. Cl........................... B29c 3/00, B30b 11/00
[58] Field of Search....... 425/77, 78, 405, 406, 412, 425/415, 423, 425, 469, 357

[56] References Cited  
UNITED STATES PATENTS

| | | | |
|---|---|---|---|
| 2,195,297 | 3/1940 | Engle | 425/78 X |
| 2,717,225 | 9/1955 | Williams | 75/208 X |
| 2,767,438 | 10/1956 | Pingel | 425/78 |
| 2,993,786 | 7/1961 | Roboff et al. | 75/208 |
| 3,201,235 | 8/1965 | Mueller et al. | 75/208 X |
| 3,743,455 | 7/1973 | Green | 425/78 |

Primary Examiner—J. Howard Flint  
Attorney, Agent, or Firm—John R. Duncan

[57] ABSTRACT

An improved diffusion molding apparatus and a process using it are disclosed. Particles of suitable metal alloys such as titanium are placed in a mold comprising a surrounding toroidal yoke and unidirectionally movable rams. The mold is encapsulated and evacuated, then the particles are consolidated through high ram pressure while the mold is at a temperature up to about 75°F below the alpha-beta transition temperature for titanium alloys. Preferred process steps and mold configurations are disclosed. The resulting parts have densities as high as 99.5 percent of wrought metal and excellent grain structure and physical and mechanical properties.

5 Claims, 2 Drawing Figures

PATENTED JAN 21 1975

3,861,839

DIFFUSION MOLDING APPARATUS

BACKGROUND OF THE INVENTION

This invention relates in general to metal fabrication and, more specifically, to diffusion molding using particulate high-strength alloys.

Alloys of titanium, aluminum, and high-strength, high-melting-temperature alloys have come into widespread use in aerospace structures, engine components, etc. These materials are very difficult and expensive to fabricate by conventional metal working techniques such as machining, forging, casting, weld assembly, etc. Recently, diffusion molding or hot pressing has begun to be used for the fabrication of parts from such alloys. Such diffusion molding techniques are described, for example, in U.S. Pat. No. 3,743,455.

While diffusion molding has been found to have a number of advantages in reducing finish machining requirements, good grain structure, etc., problems remain. Generally, molds were not reuseable, since they would deform during the hot pressing cycle and/or would stick to the molded part and require cutting and grinding of the mold for removal.

Obtaining the desired high density and freedom from included impurities has been difficult. Transmitting pressure uniformly to all parts of the mold without the formation of flash between mold components has been a problem. In order to keep the process economical, it is also necessary to reduce the cost of the molding powder.

Thus, there is a continuing need for improvements in the diffusion molding of titanium and other alloys.

SUMMARY OF THE INVENTION

It is, therefore, an object of this invention to provide a molding apparatus overcoming the above-noted problems.

Another object of this invention is to provide a reuseable diffusion molding apparatus.

Still another object of this invention is to provide a diffusion molding apparatus producing products of improved density and excellent physical and mechanical properties.

The above objects, and others, are accomplished in accordance with this invention by a diffusion molding system using a mold basically comprising a base plate, a continuous yoke around the mold cavity supported by the base plate and an upper pressure plate. Mold components may extend upwardly of the base plate or downwardly of the pressure plate between the mold components to press a powder within the mold cavity as the pressure plate is pressed downwardly. While such a unidirectional pressure application is preferred for simplicity and reliability, pressure can also be applied from another direction, such as through an opening in the yoke, where parts of complex shape are being produced.

While the mold cavity within the yoke may have any shape appropriate to the part being made, it is preferred that the outer wall of the yoke be generally circular, to reduce bulging or other deformation of the yoke during pressing. With the circular, generallly toroidal, configuration, the yoke may be reused for the pressing of a number of parts. A large yoke may be used and the mold cavity may be subdivided so that a number of smaller parts can be pressed simultaneously.

Preferably, the yoke and other outer mold components have a lower coefficient of expansion than the molding material and internal mold components. This will produce sideways pressure on the molding material during heating and will decrease the clearances between mold parts, resulting in less flash. Also, as the mold components cool after molding, the components will be more easily separated.

BRIEF DESCRIPTION OF THE DRAWING

Referring now to the drawing, which illustrates a preferred embodiment of the mold apparatus of this invention.

DETAILED DESCRIPTION OF THE INVENTION

Figure 1:
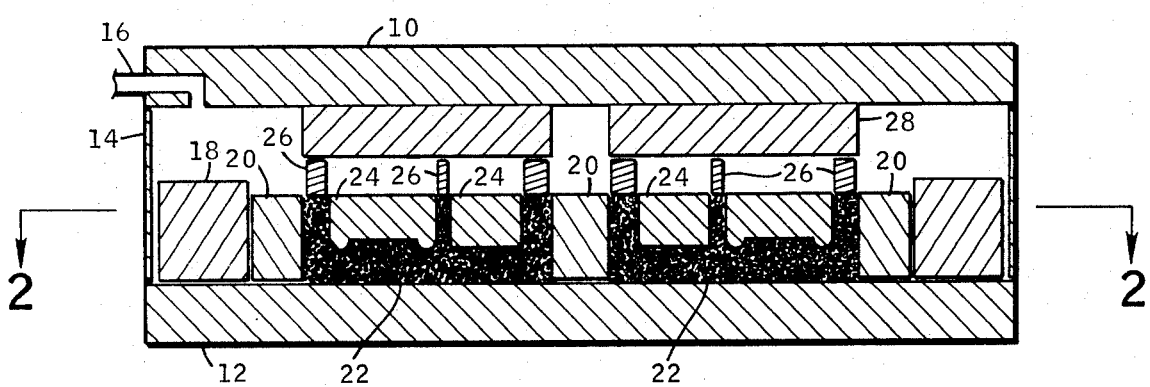
FIG. 1 is a vertical section through a diffusion molding assembly, taken on line 1—1 in FIG. 2.

Referring now to FIG. 1, there is shown a schematic vertical section through a diffusion molding apparatus according to this invention.

Basically the apparatus is a closed structure bounded by a top plate 10, a bottom plate 12, and an intermediate strip 14. Strip 14 is secured to the top and bottom plates by a means, such as welding, which seals the assembly air-tight. Strips 14 may be eliminated if the process is carried out in a vacuum hot press.

Figure 2:
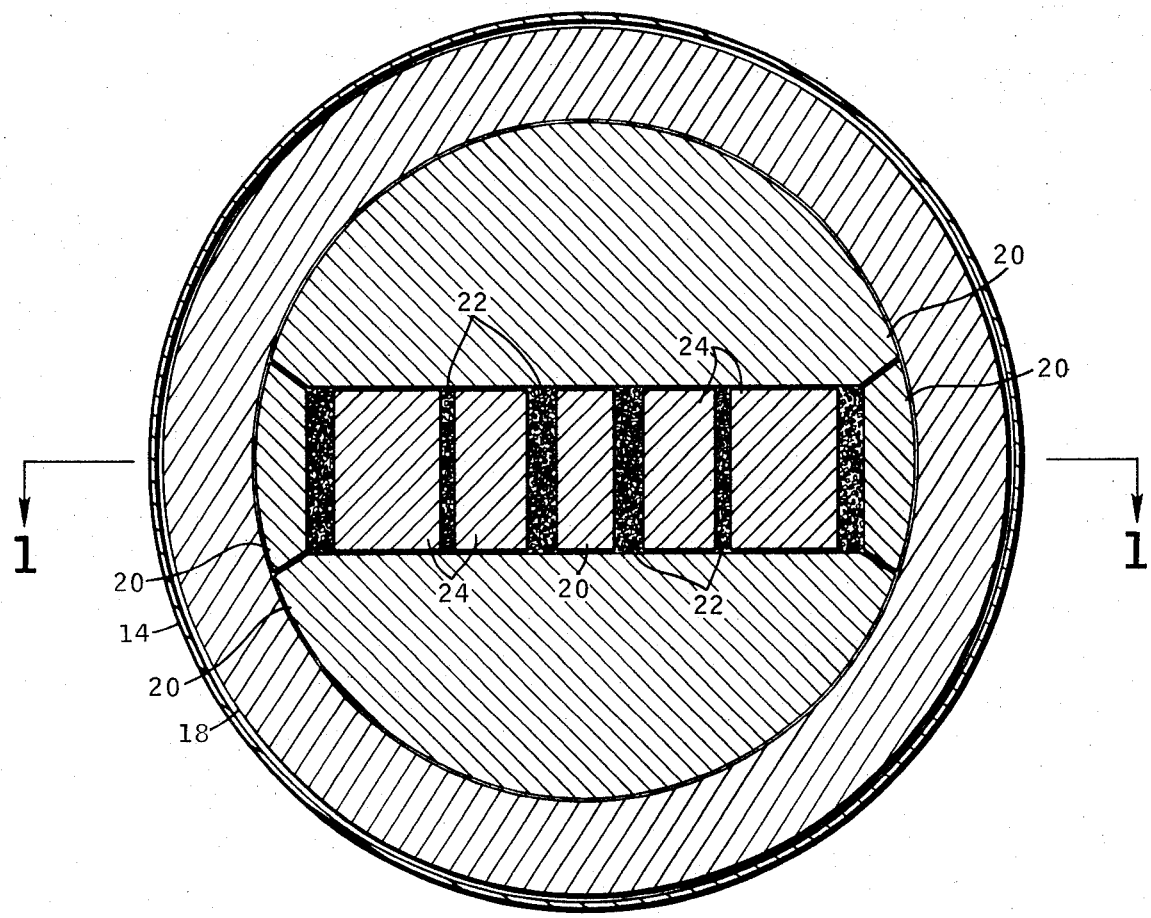
FIG. 2 is a horizontal section through a diffusion molding assembly, taken on line 2—2 in FIG. 1.

Preferably, as is discussed below, the enclosure is cylindrical in shape, as seen in FIG. 2, with disk-shaped top and bottom plates 10 and 12. Any suitable material may be used for plates 10 and 12 and strip 14. Superalloy tools (such as Haynes 188) are preferred for diffusion molding titanium or other high-melting-temperature alloys. Stainless steel is preferred such as standard 304 and 321 stainless steel, for diffusion molding aluminum alloy products.

One or more tubes 16 may be formed through the enclosure to permit the enclosure to be evacuated or to be flushed with an inert gas.

A generally toroidal yoke 18 is located within the enclosure. This shape is strongly preferred, since it has been found highly resistant to bulging or deforming during the diffusion molding operation, thus producing more uniform parts. The various mold components are positioned within yoke 18 on bottom plate 12.

Many different internal mold configurations may be used in this system. One large object may be molded, or several similar or different smaller objects may be formed simultaneously. A typical arrangement for molding two objects is illustrated.

A number of locating bars 20 are positioned to define the outer vertical walls of the objects to be formed. These bars 20, in the aggregate, have a circular outer wall engaging the inner wall of yoke 18 and inner walls forming mold cavities. The inner wall of yoke 18 and the outer wall of bar assembly 18 may have corresponding slight conical tapers, if desired, to facilitate separation after molding. Powdered material 22 to be diffusion molded is placed in these cavities. Forming blocks 24 are inserted into powdered material 22 where pockets are desired in the molded object. Of course, these blocks could be placed on and in contact with bottom plate 12 and extend upwardly into powdered material 22.

A number of punch members 26 are located above powdered material where higher portions, such as upstanding webs or legs, are desired in the molded object. A pressure plate 28 fills the gap between punches 26 and top plate 10.

As detailed below, when the assembly is placed in a diffusion molding press and downward pressure is applied to top plate 10, punches 26 are forced down, consolidating powdered material 22. In some cases, pressure plate 28 will be forced down only until it contacts blocks 24, since the movement of punches 26 may be sufficient to consolidate the powdered material 22 throughout the mold. In other cases, the pressure plate 28 will further force blocks 24 downwardly, to further consolidate powdered material 22 in the mold cavity below blocks 24.

As is apparent from this description of the schematically represented mold assembly shown, a wide variety of molded object shapes can be produced by proper selection of molding bar 20, blocks 24, punches 26, etc.

Any suitable material may be used for the various mold components. Typical materials include stainless steels, such as 304 or 321, Inconel 618, Haynes 25 or 188, graphite, ceramics, and combinations thereof. Typically, the tools may be machined or cast. In some cases improved results can be obtained by using materials having different coefficients of thermal expansion. Utilizing interior parts having higher expansion than exterior parts can reduce clearances during the hot pressing, while retaining greater room temperature clearances for ease of mold assembly and disassembly. For example, where yoke 18 has low expansion and bars 20, blocks 24 and punches 26 have higher thermal expansion characteristics, the parts will be pressed more tightly together at high temperatures, reducing flash formation, such as between the punches and adjacent blocks.

The mold assembly is prepared for use by installing yoke 18, bars 20, powdered material 22 and blocks 24 in the desired arrangement on bottom plate 12, adding punches 26, pressure plate 28 and top plate 10, then welding strip 14 around the mold sides. The weld seal is checked by drawing and holding a slight vacuum on tube 16. Then the enclosure is either flushed with an inert gas, such as argon, or evacuated to a vacuum of at least about $3 \times 10^{-5}$ torr. The vacuum is preferred (dynamic or continuous), since small amounts of an inert gas may be trapped in the molded object, resulting in pores and reduced density. Tube 16 is sealed and the mold assembly is ready for use.

In diffusion molding using the mold assembly described above, the mold is heated to a diffusion temperature, usually just below the alpha-beta transition temperature, and the top and bottom plates are squeezed toward each other. Excellent consolidation of the material occurs despite the unidirectional pressure application. While the pressure may be applied before, during, or after heating, best results are generally obtained when the mold is first heated to the diffusion temperature, then the pressure is applied and the pressure and temperature are maintained for the desired period. This pre-heating technique allows impurities to outgas rather than be trapped in the material.

Any suitable material may be diffusion molded in the described mold assembly. Generally, diffusion molding is most cost effective with materials such as titanium, beryllium, molybdenum, tantalum, tungsten, etc., which are difficult to machine or melt cast. Titanium alloys are preferred, because of their excellent diffusion molding characteristics and the number of applications for titanium structures, especially in the aerospace industry. Typical titanium alloys include Ti-6Al-4V, Ti-5Al-2.5Sn, Ti-6Al-2Sn-4Zr-2Mo, Ti-3Al-8V-4Mo-4Zr, and Ti-13V-11Cr-3Al.

The molding powder may have any suitable shape. Typically, the powder may comprise small cubes or prisms, spherical pellets, random particles, flakes, chips, etc. Best results are generally obtained with pre-alloyed powder particles because of their greater homogenity. Preferably, the average mesh size of the particle is from about −40 mesh to +325 mesh. Best results are obtained with particles in the about −40 to +200 mesh range.

The molding powder may be prepared in any suitable manner. Random angular-shaped particles may be produced by hydriding bulk material, crushing the brittle material to be desired particle size, then dehydriding it. Spherical powder may be made in a shot tower, or by rotating a molten electrode to throw off droplets. Random rounded shapes may be produced by splashing molten material against a cooled surface. A bar of material may be melted by induction heating in an argon environment, with melted droplets quenched in liquid argon or nitrogen, or in a water-filled crucible. Wire pieces may be obtained by shearing wires. Cubes or prisms may be produced by cutting from sheet stock, such as by mechanical shearing or by cutting with a high energy laser or a concentrated plasma arc. Waste chips produced in machining can be cleaned and used in this process, with a hydriding-crush-dehydried step if the chips are too large. Elemental powders may be blended in proportions necessary to produce parts of a desired alloy, such as Ti-6Al-4V. In some cases, hydrided material may be dehydrided during the diffusion molding operation by holding the mold at a dehydriding temperature for a sufficient period before pressing.

The mold assembly can be heated to the diffusion molding temperature by any suitable method. Typical methods include conduction from heated press members in contact with the top and bottom plates, convection/conduction from a heated atmosphere around the mold assembly, resistance heating directly through the assembly and induction heating from a coil surrounding the assembly, or a combination thereof. Induction heating is preferred because induced currents aid the diffusion and, hence, the sintering of the particles. Induction heating also permits fast heating rates (about 1,000°F/hour) and fast cooling rates.

Preferably, a parting agent is placed on those mold surfaces in contact with other mold surfaces or with the molding material to prevent diffusion bonding between those surfaces during the molding process. Any suitable parting agent may be used. Typical parting materials include surface oxide on the tool, alumina sheets, ceramic paper (e.g., Fiberfrax ceramic sheets available from Aerospex Corp.), graphite cloth, colloidal graphite paste (e.g., Aquadag, available from Acheson Industries), Tungsten disulfide, boron nitride, plasma sprayed alumina or yittria, or a combination of these. Of these, graphite paste is preferred because of its effectiveness as a parting material and its convenience in application. With the graphite materials, there may be a slight surface reaction apparently forming a carbide. In some cases, a tough surface layer, such as a titanium carbide, with its high wear and abrasion resistance, may be highly desirable. However, if it is not desired, it can be removed by light surface machining or grinding.

Further details of the process of this invention will be understood upon reference to the following examples which describe several preferred embodiments. All parts and percentages are by weight, unless otherwise indicated.

EXAMPLE I

A toroidal yoke having a height of about 1 inch, inner diameter of about 8.5 inches, and an outer diameter of about 10 inches is placed on a bottom plate which is in the form of a 1-inch thick disk about 10.5 inches in diameter. A plurality of locating bars is fitted within the yoke. The locating bars conform to the inner wall of the yoke and have two approximately $2.1 \times 3.5$ inch mold cavities. Each cavity is lined with 0.01 inch thick Fiberfrax ceramic sheets. One cavity is filled with $-35$ to $+300$ mesh spherical Ti-6Al-4V powder available from Whittaker Corp. and the other is filled with irregular shaped Ti-6Al-4V powder, $-35$ to $+325$ mesh, available from Numec. A 0.01 inch thick Fiberfrax ceramic sheet is placed over each filled mold cavity. Then two $2.1 \times 3.5$ by 1.15 inch pressure blocks are placed over the mold cavities. A 10.5 inch diameter, 1-inch thick, disk-shaped top plate is placed on the pressure blocks. During mold assembly, 0.01 sheets of Fiberfrax ceramic sheets are placed between all contacting mold parts. Graphite paste is applied with a brush over the inside walls of the yoke. All of the above-mentioned mold components are formed from 304 stainless steel. A tube connected to a vacuum system passes through the top plate. A strip of 321 stainless steel is wrapped around the assembly and welded to the top and bottom plates in an argon atmosphere to prevent any oxidation of the powder. The pack is leak tested, then evacuated to a vacuum of about $5 \times 10^{-5}$ torr. The assembly is surrounded by 0.25 inch thick asbestos plates and placed in a 100 ton hydraulic press with heated platens. A water-cooled induction coil is placed around the assembly and connected to a Hull 30 KW motor generator. The assembly is heated slowly to about 800°F and allowed to outgas. The assembly is continuously evacuated. The temperature of the assembly is raised to about 1,725°F, the diffusion molding temperature, over about 2.5 hours. Pressure is then applied and gradually increased to about 3,000 psi. The temperature and pressure are maintained for about 3 hours, then the pressure is released, the induction heating system is removed and the assembly is allowed to cool for about 4 hours in a continuous vacuum. The welding strips are milled away with an end mill and the assembly is disassembled. Two plates each about 3.5 by 2 by 0.4 inch result. Densities of about 99.5 percent of theoretical are produced, with tensile properties similar to those of wrought material.

EXAMPLE II

A diffusion molding assembly to form a part of the sort shown in the drawing is assembled. A yoke having a height of about 3 inches, an outer diameter of about 15.5 inches and a 9 by 9 inches square internal cavity, is placed on a 16 inch diameter, 1 inch thick plate. All tooling components are fabricated from Haynes 188 superalloy material. All parts are machined, vapor honed and cleaned, then contacting surfaces are coated with Aquadag colloidal graphite paste material in water and allowed to dry overnight. The cavity is partially filled with about 7 pounds of NUMEC Ti-6Al-4V alloy angular powder. This powder, prepared by the hydride/dehydride process, contains about 60 percent $-40$ to $+100$ mesh powder, with about 10 percent fines ($-400$ mesh). Suitable forming blocks are installed to produce a product of complex shape having wall thicknesses varying from about 0.125 to 0.5 inch. The remainder of the powder, about 5 pounds, is used to fill the wall spaces. Appropriate punches are installed and a 9 by 9 by 1 inch pressure plate is added in contact with the punches. Finally, the 1 inch thick, 16 inch diameter top plate is installed. A 0.06 inch strip is wrapped around the assembly and welded to the top and bottom plates. Two 0.75 inch diameter evacuation tubes are inserted and welded in holes in the top plate. The pack is leak tested with a Veeco leak tester. Leaks, if any, are repair welded. The pack is placed in a 100 ton hydraulic press and evacuated to about $3 \times 10^{-5}$ torr. A 17 inch diameter induction coil with six turns of 0.25 inch diameter copper tubing is placed around the pack. The coil and pack are insulated from each other by 0.25 inch thick asbestos sheets between the pack and induction coil. The pack is covered well with layers of Fiberfrax ceramic sheets to reduce heat loss. A 30KW Hull motor generator is connected to the coil and turned on. The pack is degassed at about 800°F for 30 minutes and then heated to about 1,725°F. A total load of about 100 tons is applied for about one hour. Total deformation, as measured by dial indicators between the two platens is about 35 percent. The motor generator is turned off and the pressure on the pack is released. The Fiberfrax insulation around the pack is removed and the pack is allowed to cool. The welded strips are torch cut. The top and bottom plates are lifted away. The product part and forming components are forced out of the yoke by applying pressure on a hydraulic press. The blocks and punches are similarly forced out. The diffusion molded part is found to have excellent density and physical and mechanical properties. The fitting has a thin wear and abrasion resistant carbide coating on all surfaces. If this is not desired, it is easily removed by sand-blasting, surface machining or chemical milling the surfaces. A small amount of flash is found at clearances between the forming parts. This is easily removed by grinding or filing.

EXAMPLE III

The operations described in Example II are repeated, except that the yoke is formed of graphite rather than Haynes 188 superalloy. The remaining parts are Haynes 188. The difference in coefficient of expansion for graphite is $4.9 \times 10^{-6}$ in/in/°F at 1,750°F, while for Haynes 188 it is $9.4 \times 10^{-6}$ in/in/°F at 1,750°F. The difference in their expansion reduces the gap or clearance among tools at 1,750°F over the 9 inch span of the molding cavity by $(4.5 \times 10^{-6}$ in/in/°F$)(1,750$°F$)(9$ inches$)$ or 0.07 inch. Thus, by keeping all clearances across the mold to less than 0.07, flash is substantially eliminated. The part produced using these mold materials is found to have substantially identical physical properties as that made by the process of Example II, and further to have substantially reduced flash.

EXAMPLE IV

The process described in Example II is repeated, except that hydrided titanium alloy powder is used. After the out-gassing of the powder and tools at 800°F, the assembly is heated to about 1,250°F for about 3 hours to complete the dehydriding. The temperature is then increased to the diffusion molding temperature and pressure is applied as described in Example II. The product produced is substantially identical to that produced in Example II.

EXAMPLE V

The process described in Example II is repeated, except that scrap titanium machining chips are used for the molding material. The titanium chips are separated from other materials, and are vapor honed and cleaned by lightly etching with a mixture of hydrofluoric and nitric acids. The chips are hydrided by heating to 800°F in a hydrogen atmosphere. The hydrided chips are brittle and fracture when passed through a jaw crusher. After reduction to the desired particle size, the particles are dehydrided at about 1,300°F in a vacuum for about 4 hours. The resulting powder is molded as described in Example II. Excellent parts of high density result.

EXAMPLE VI

A toroidal yoke having a height of about 6 inches, inner diameter of about 3 inches and outer diameter of about 6 inches is placed on a 1-inch thick disk-shaped bottom plate having a diameter of about 8 inches. A six inch high cylindrical block having a diameter of about 1.5 inches is placed at the center of the assembly. The space between the block and yoke is filled with 7000 series aluminum alloy powder having particle sizes in the −30 to +400 mesh range. A 3-inch high ring shaped punch having an inner diameter of about 1.5 inches and an outer diameter of about 3 inches is placed over the powder and an upper plate, similar to the bottom plate, is placed over the punch. All mold components are 304 stainless steel. The surfaces of the mold components in contact with the powder are plasma sprayed with a very thin coating of alumina as a parting agent prior to assembly. The assembly is placed in a closed press which is flushed with nitrogen. The assembly is heated to about 300°F in the nitrogen atmosphere to degas the assembly. The assembly is heated (by an induction coil surrounding the assembly) to about 1000°F and subjected to a pressure of about 5,000 psi for about 2 hours. The pressure is then released and the assembly is cooled to room temperature. The block, punch and product are pressed out of the yoke with a small hydraulic press. The resulting ring-shaped product is well consolidated with excellent mechanical properties.

EXAMPLE VII

The process of Example VI is repeated, except that the mold is filled with a mixture comprising about 60 percent by weight aluminum alloy powder having particle sizes in the −20 to +300 mesh range and about 40 percent by weight silicon carbide coated boron fibers (available from the Hamilton-Standard Division of United Aircraft under the "Borsic" trademark). The fibers have random lengths primarily in the 0.01 to 0.25 inch range. The resulting product is found to have exceptionally high strength.

EXAMPLE VIII

A toroidal yoke having a height of about 2 inches, an inner diameter of about 6 inches and an outer diameter of about 12 inches is placed on a 1-inch thick 14-inch diameter disk-shaped bottom plate. The cavity is filled with Inconel 718 powder, available from International Nickel Co., having particle sizes in the −40 to +300 mesh range. A 2-inch thick, 6-inch diameter, disk-shaped punch is placed over the powder and a top plate similar to the bottom plate is placed thereover. All of these mold components are formed from alumina obtained from Coors, Inc. The assembly is placed in an enclosed press and an induction coil is placed around the assembly. The enclosure is evacuated to a pressure of about $5 \times 10^{-5}$ torr and the assembly is heated to about 800°F for about 2 hours to degas the assembly. The assembly is heated to about 2,100°F and subjected to a pressure of about 10,000 psi for about 2 hours. The assembly is removed from the press after cooling to about 300°F, then is cooled to room temperature and the diffusion molded disk is removed from the yoke. The superalloy disk produced is found to have uniform high density and excellent properties.

Specific mold arrangement, conditions, materials, etc. have been presented in the above examples of preferred embodiments. These may be varied and other materials and conditions may be used, where suitable, with similar results, as indicated above.

Other variations, applications and ramifications of the present invention will become apparent to those skilled in the art upon reading this disclosure. These are intended to be included within the scope of this invention as defined in the appended claims.

I claim:

1. A diffusion molding assembly comprising:
   a bottom plate:
   a substantially toroidal yoke on said bottom plate;
   a plurality of mold bars assembled within said yoke, said mold bar assembly being in contact with the inner surface of said yoke and defining at least one mold cavity within said yoke;
   pressure members extending across the upper open end of each mold cavity;
   a top plate in contact with said pressure member; and
   at least some of said mold bars and pressure members comprising a material having a higher coefficient of thermal expansion than does the yoke material whereby mold part clearances are reduced as the assembly is heated.

2. The assembly according to claim 1 wherein said pressure members comprise at least one mold block extending into at least some mold cavities; at least one punch covering top areas of said mold cavities not covered by a mold block; and pressure plates in contact with said punches conforming in shape to the top area of each mold cavity whereby downward pressure on said top plate will be tranmitted to said pressure plates and punches.

3. The assembly according to claim 1 wherein each mold cavity is lined with, and all contacting mold parts are separated by, a parting agent selected from the group consisting of graphite paste and ceramic sheets.

4. The assembly according to claim 1 further including a sealing means sealing the space between said top and bottom plates and evacuation means to substantially evacuate said mold cavities within said assembly.

5. The assembly according to claim 1 further including an induction coil surrounding and closely spaced from said yoke, adapted to rapidly heat said mold cavity.

* * * * *